United States Patent
Elliott et al.

(10) Patent No.: US 10,246,178 B2
(45) Date of Patent: Apr. 2, 2019

(54) OPTIMIZED PITCH AND ROLL CONTROL APPARATUS FOR AN AIRCRAFT

(71) Applicant: THE BOEING COMPANY, Chicago, IL (US)

(72) Inventors: Joseph E. Elliott, Shoreline, WA (US); Andrew Sones, Chicago, IL (US); John Standley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 15/204,889

(22) Filed: Jul. 7, 2016

(65) Prior Publication Data

US 2018/0009523 A1    Jan. 11, 2018

(51) Int. Cl.
*B64C 13/28* (2006.01)
*B64C 13/12* (2006.01)
*B64C 13/04* (2006.01)

(52) U.S. Cl.
CPC .............. *B64C 13/28* (2013.01); *B64C 13/04* (2013.01); *B64C 13/12* (2013.01)

(58) Field of Classification Search
CPC .......... B64C 13/28; B64C 13/04; B64C 13/12
See application file for complete search history.

(56) References Cited

U.S. PATENT DOCUMENTS

| | | | |
|---|---|---|---|
| 2,398,601 A | 4/1946 | Seifert | |
| 3,390,587 A | 7/1968 | Ratliff, Jr. | |
| 3,898,823 A * | 8/1975 | Ludeman | B64C 13/14 244/224 |
| 5,082,213 A * | 1/1992 | Torres | B64C 13/04 244/224 |
| 6,178,788 B1 * | 1/2001 | Winner | B60R 25/0221 244/224 |
| 2009/0321583 A1 * | 12/2009 | Taylor | B64C 13/04 244/234 |
| 2013/0031997 A1 * | 2/2013 | Caravella | B64C 13/04 74/471 R |

FOREIGN PATENT DOCUMENTS

WO    2009023941    4/2009

OTHER PUBLICATIONS

European Patent Office Extended European Search Report, Application No. 17170886.0-1754, dated Jul. 7, 2017.
Communication Pursuant to Article 94(3) EPC dated Aug. 6, 2018 for Application No. 17170886.0, 5 pgs.

* cited by examiner

*Primary Examiner* — Valentina Xavier

(57)    ABSTRACT

An apparatus for controlling the pitch of an aircraft. The apparatus includes a horizontal control column extending from a control wheel horizontally towards a front wall of a cockpit. A pitch output link is connected to a downstream pitch control mechanism to transfer a force applied at the pitch output link to the downstream pitch control mechanism. A transfer assembly is connected to the horizontal control column and to the pitch output link. The transfer assembly translates a horizontal force applied to the horizontal control column to the pitch output link to provide the force applied to the downstream pitch control mechanism.

20 Claims, 8 Drawing Sheets

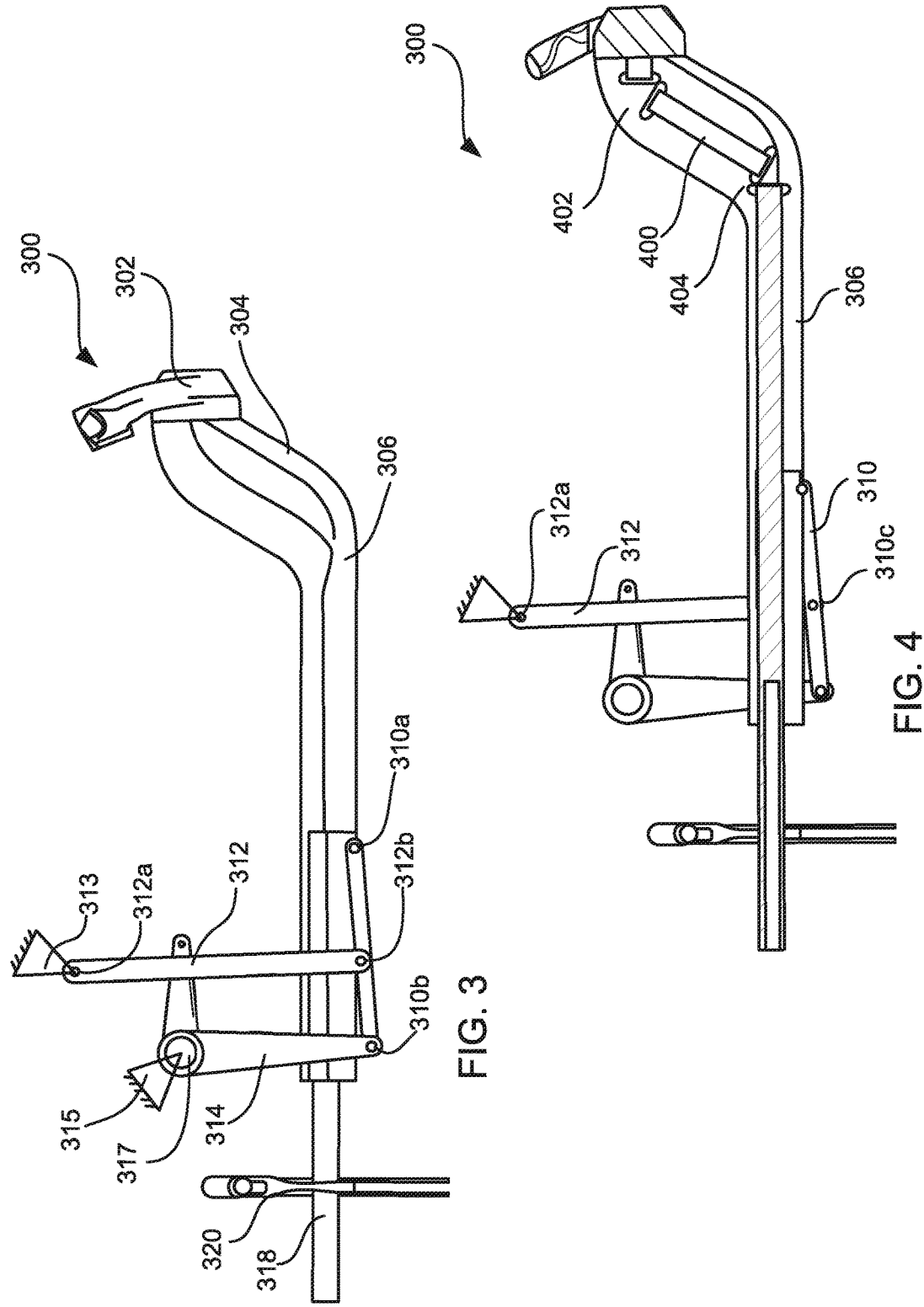

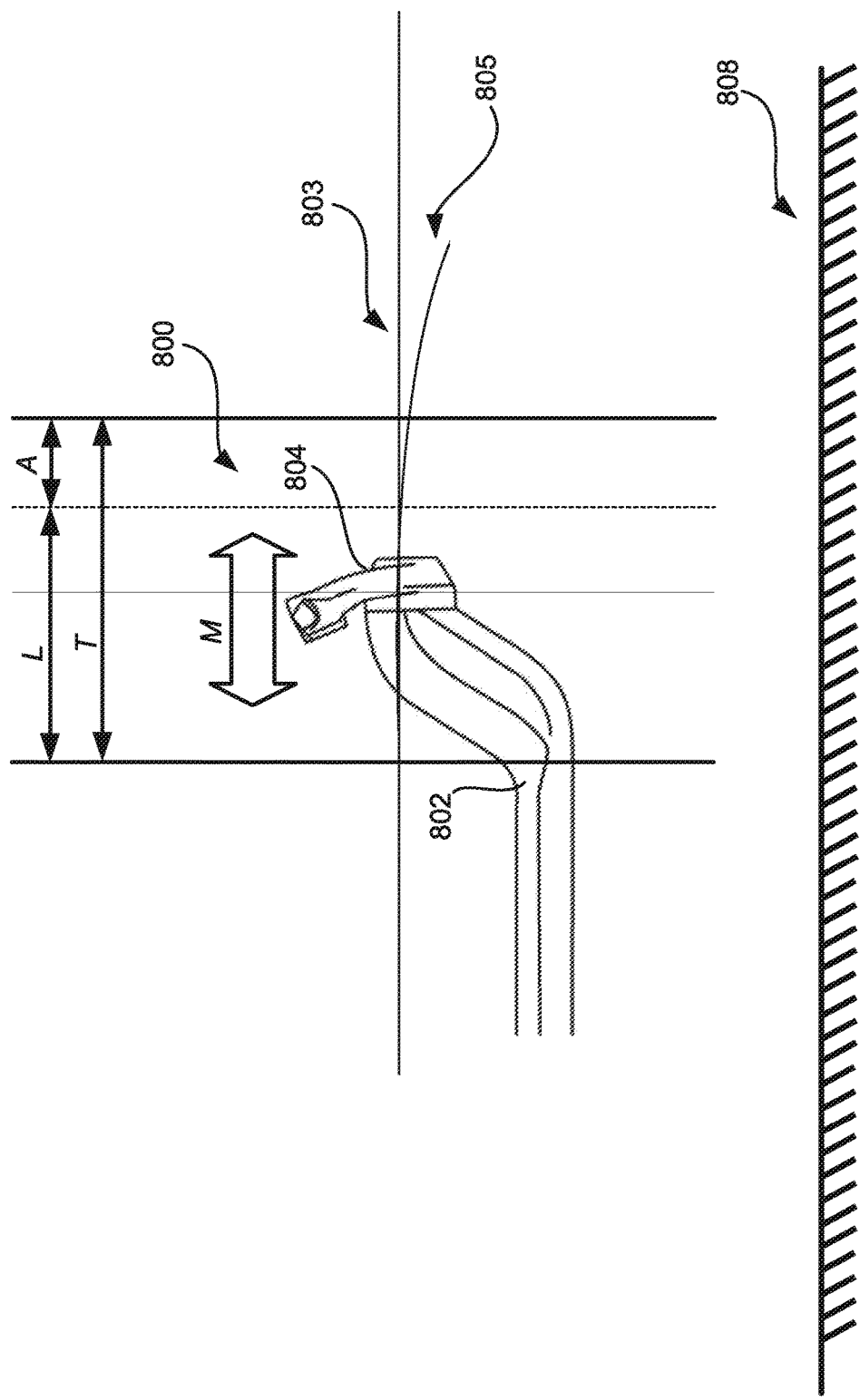

OPTIMIZED PITCH AND ROLL CONTROL APPARATUS FOR AN AIRCRAFT

BACKGROUND

1. Field

The present disclosure relates generally to aircraft control devices, and more particularly, to apparatuses for controlling aircraft pitch.

2. Related Art

The most common design of an aircraft control yoke (i.e., pitch and roll control) is a steering (i.e., roll) mechanism mounted at the top of a vertical column that extends to or through the floor of the cockpit. The yoke is pushed forward and pulled backward by the pilot to control pitch. Rotation of the steering mechanism is transferred to the aircraft roll control mechanisms, while fore and aft motion is transferred to the aircraft pitch control mechanisms.

The current designs of aircraft control yokes suffer from several drawbacks. First, the control column extending from the yoke is positioned directly in front of the pilot and between the pilot's legs. Current designs also include associated mechanisms occupying the space under the cockpit floor. Some horizontally oriented control columns have been developed for use in flight simulators and single engine planes. However, the solutions implemented in flight simulators and single engine planes would not meet regulatory requirements and/or pilots' expectations in a large commercial aircraft.

The solutions used in flight simulators and single engine planes would extend directly forward into the front wall of the cockpit using space that is occupied by large digital instrument panels in commercial aircraft. These flight simulator and single engine plane solutions employ a control wheel through the front wall that extends to a floor-hinged control column apparatus that further extend below the floor. Such solutions involve pilots perfoiining control motions that pilots typically find awkward compared to the traditional vertically mounted control columns. Pilots are accustomed to moving in an arc motion when pulling the control column to a fully-aft end of travel causing the airplane to be at a fully nose-up position. Horizontally oriented control columns used in flight simulators and single engine aircraft are also completely supported by plain bearings or rollers and guide rails prone to backlash, friction and contamination. Some solutions use wire rope cables or roller chains in critical control paths, both of which may be labor-intensive, costly, and prone to undesirable tactile sensation. Solutions used in flight simulators and single engine aircraft also lack redundancy required by government regulations for such flight control inceptors and associated mechanisms in large aircraft.

In view of the above, it would be desirable to control aircraft pitch using a control mechanism that does not extend through the floor of a cockpit, extends through the front of the cockpit without limiting any instrument panel components, and is not supported by sliding structures nor exclusively by any bearing or wheel structures.

SUMMARY

An apparatus is provided for controlling an aircraft's pitch. In an example implementation, a pitch control apparatus includes a horizontal control column extending from a control wheel horizontally towards a front wall of an aircraft cockpit. A pitch output link having a first pitch output link connection point and a second pitch output link connection point connects to a downstream pitch control mechanism. The pitch output link transfers a force applied at the first pitch output link connection point to the downstream pitch control mechanism. A transfer assembly is connected to the horizontal control column and to the pitch output link at the first pitch output link connection point. The transfer assembly is configured to translate a horizontal force applied to the horizontal control column to the pitch output link.

In another example implementation, the pitch control apparatus includes a horizontal control column extending from a control wheel in a direction substantially parallel to an aircraft cockpit floor. The horizontal control column extends under an aircraft instrument panel and through a cockpit fore wall. A linkage system is attached to at least one aircraft structure point and to the horizontal control column. The linkage system supports the horizontal control column and enables fore and aft movement of the horizontal control column substantially along a plane substantially parallel to the aircraft cockpit floor. A pitch output link is connected to transfer a first force received via fore and aft movement of the horizontal control column to a second force applied to a downstream pitch control mechanism. The downstream pitch control mechanism alters a pitch angle of the aircraft in response to the second force.

Other devices, apparatus, systems, methods, features and advantages of the subject matter described herein will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

This disclosure may be better understood by referring to the following figures. The components in the figures are not necessarily to scale, emphasis instead being placed upon illustrating the principles of the disclosed subject matter. In the figures, like reference numerals designate corresponding parts throughout the different views.

FIG. 3 is a side view of an apparatus for control of aircraft pitch that may be used in the aircraft control console in FIG. 1.

FIG. 4 is a cross-sectional view of the apparatus depicted in FIG. 3.

FIG. 8 is a schematic diagram of an aft section of the horizontal control column and control wheel illustrutating an example of the fore-aft travel of the horizontal control column during operation.

DETAILED DESCRIPTION

Disclosed is an apparatus for control of aircraft pitch. The apparatus includes a horizontal control column, a pitch output link, and a transfer assembly. The horizontal control column extends at a downward angle from a control wheel then horizontally towards a front wall of an aircraft cockpit. The pitch output link has a first pitch output link connection point and a second pitch output link connection point connected to a downstream pitch control mechanism. The pitch output link is configured to transfer a force applied at the first pitch output link connection point to the downstream pitch control mechanism. Moreover, the transfer assembly is connected to the horizontal control column and to the pitch output link at the first pitch output link connection point. The transfer assembly is configured to translate a horizontal force applied to the horizontal control column to the pitch output link.

Figure 1:
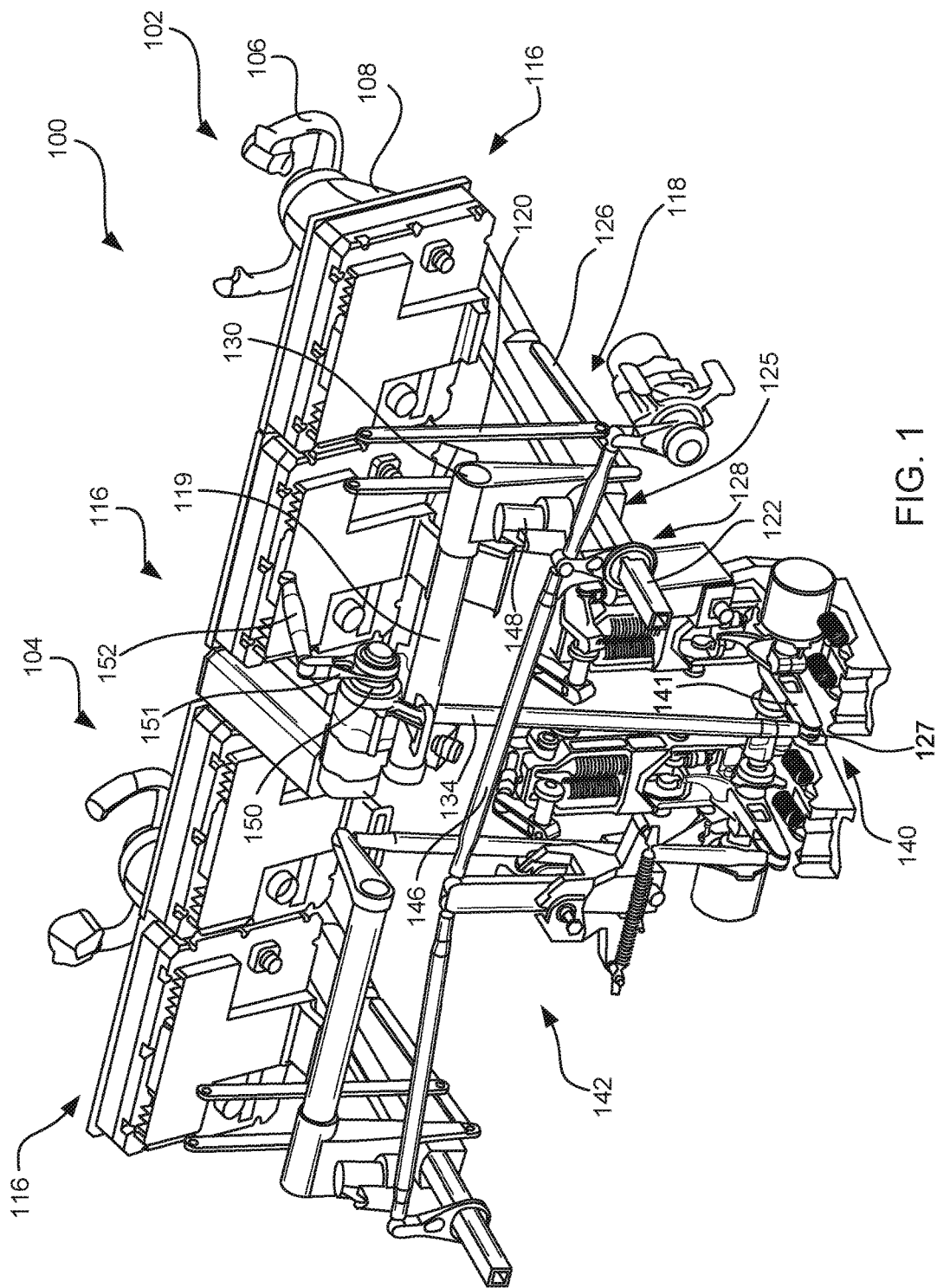
FIG. 1 is a perspective transparent view of an aircraft control console in an example cockpit of an aircraft.

Turning to FIG. 1, a perspective transparent view is shown of an aircraft control console 100 in an example cockpit of the type found in a typical commercial aircraft. The aircraft control console 100 includes a pilot's aircraft pitch control apparatus 102 and a co-pilot's aircraft pitch control apparatus 104. The pilot controls the pitch of the aircraft by applying a horizontal force to a control wheel 106 on the pilot's aircraft pitch control apparatus 102. The co-pilot's aircraft pitch control apparatus 104 is understood in the example in FIG. 1 to be equipped the same as the pilot's aircraft pitch control apparatus 102. Accordingly, the focus of the description with reference to FIG. 1 of example apparatuses for controlling an aircraft pitch will be on that of the pilot's aircraft pitch control apparatus 102.

The pilot controls the pitch of the aircraft by pushing or pulling on the control wheel 106. The pilot increases the aircraft pitch (i.e., the nose of the aircraft is pointing upward) by pulling the control wheel 106 in the aft direction, or rearward. The pilot decreases the aircraft pitch (i.e., the nose of the aircraft pointing downward) by pushing the control wheel 106 in the fore direction, or forward. In some implementations, at least parts of the pitch control apparatus 102 may also be components of the aircraft roll control mechanism. The pilot can control the roll of the aircraft by rotating the control wheel 106. Rotating the control wheel 106 in a clockwise motion causes the plane to roll to the right. Rotating the control wheel 106 in the counter-clockwise direction causes the plane to roll to the left.

Figure 2A:
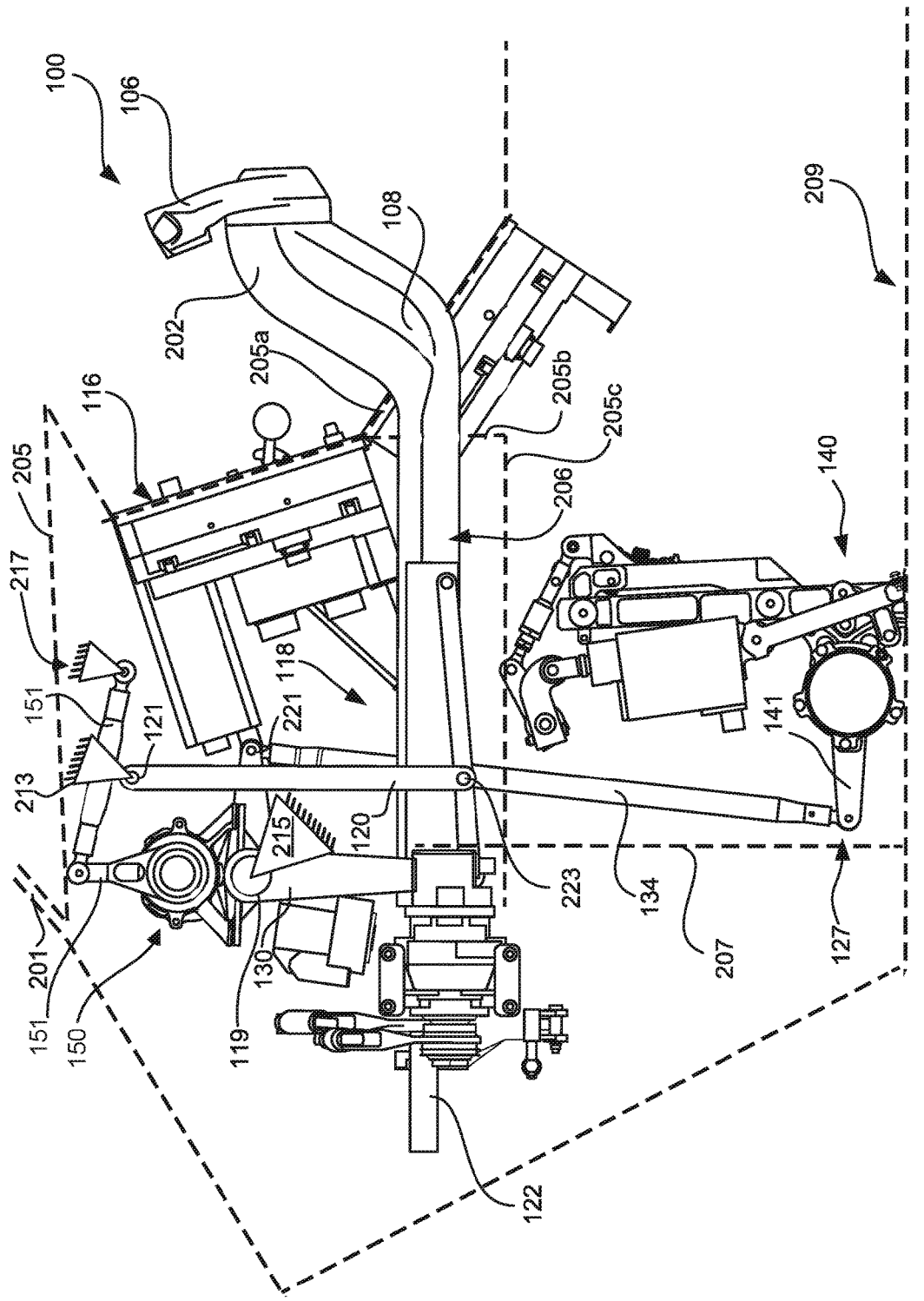
FIG. 2A is a side transparent view of the aircraft control console of FIG. 1.

The aircraft control console 100 also includes a front instrument panel 116 extending across the cockpit positioned in front of both the pilot and the co-pilot. The front instrument panel 116 is typically specified to conform to government regulations for large aircraft. Such regulations affect the content, position and size of the front instrument panel 116, which in turn affects the space available to the pilot and co-pilot in the cockpit. FIG. 2A is a side transparent view of the aircraft control console of FIG. 1. FIG. 2A includes a dashed line representing an outline of the cross-sectional view of the structure of the aircraft that limits the space in the cockpit. The space in the airplane cockpit is defined by a window portion 201 and a front surface of the console 205. The cross-sectional outline of the console 205 extends into the cockpit at the front instrument panel 116. Part of the console 205 extends downward and diagonally along the front surface of the front instrument panel 116 extending rearward at 205a to include additional instrument components positioned between the pilot and co-pilot. The other part of the console extends downward at 205b and towards the front at 205c towards the front wall 207. In different example implementations, the front wall 207 of the cockpit may be disposed at any point behind the front instrument panel 116 when viewed from the pilot's position. FIG. 2A also shows a cockpit floor at 209.

Referring to FIGS. 1 and 2A, the pitch control apparatus 102 includes a horizontal control column 108 extending at a downward angle at 202 from the control wheel 106, then horizontally at 206 towards the front wall 207 of the aircraft cockpit. The horizontal control column 108 extends horizontally substantially beneath the front instrument panel (as shown at 206) and through the front wall to control a downstream pitch control mechanism 140 and a roll control assembly 142 disposed on the fore-side of the front wall. The downstream pitch control mechanism 140 includes systems and sub-systems that adjust the elevator, or the pitch mechanism, in response to the output of the pitch control apparatus 102. The roll control assembly 142 includes systems and sub-systems that adjust the ailerons, or other mechanisms, that cause the aircraft to roll in response to the pilot operation of a roll control apparatus.

The horizontal control column 108 encloses a roll control shaft 122 configured provide a roll input to the roll control assembly 142 in response to the turning of the control wheel 106 by the pilot. The roll control shaft 122 also moves forward and aftward in response to a pilot's pushing and pulling of the control wheel 106 to adjust the aircraft pitch. It is noted that in an example implementation, the horizontal control column 108 may be configured without a roll control shaft 122 or with other structure that provides an input to the roll control assembly 142. In another example implementation, the roll control shaft 122 may be implemented to operate as a simple translating support shaft for the horizontal control column 108, or other components of the pitch control apparatus 102, and lack any function with respect to controlling the roll of the aircraft. In other example implementations, the roll control shaft 122 is part of a rotation input assembly described below in more detail with reference to FIG. 4. The rotation input assembly extends from the control wheel 106 and through the horizontal control column 108. The roll control shaft 122 extends from a front end opening 125 of the horizontal control column 108. In such implementations, the roll control shaft 122 is configured to rotate in response to a pilot's rotation of the control wheel 106 and to transfer a rotational force to the roll control assembly 142. In the description that follows, the roll control shaft 122 is configured to provide a rotation as an input to the roll control assembly 142.

The roll control shaft 122 extends forward through a self-aligning bearing 128 configured to guide and provide some degree of support as the roll control shaft 122 moves aftward and forward through the self-aligning bearing 128. A component of the self-aligning bearing 128 is fixedly attached to an aircraft structure portion as described in more detail with reference to FIG. 2B. In an example implementation, the self-aligning bearing 128 includes components used in converting the rotation of the roll control shaft 122 to a force that adjusts the roll of the aircraft, also described below in more detail with reference to FIG. 2B. The rotational force generates a lateral force on a roll pushrod 146, which triggers the roll control assembly 142 to adjust the ailerons that cause the aircraft to roll.

Figure 2B:
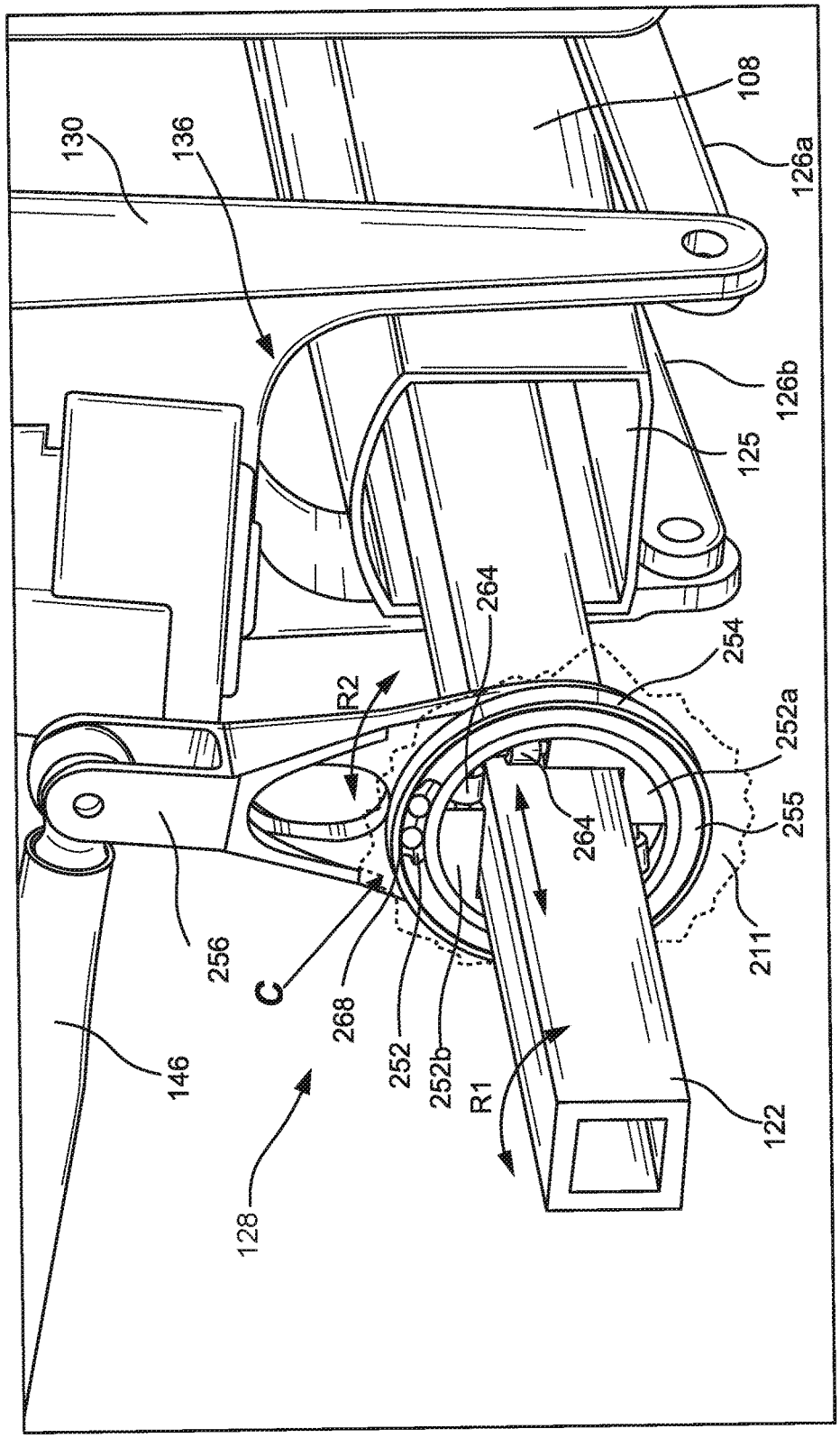
FIG. 2B is a perspective view of an example implementation of the self-aligning bearing.

FIG. 2B is a perspective view of an example implementation of the self-aligning bearing 128 of a type that may be used in the pitch control apparatus 102 in FIG. 1. The view in FIG. 2B is a close-up of the self-aligning bearing 128, which includes a self-aligning bearing inner race 252, a self-aligning bearing outer race 254, a roll control crank 256, and a plurality of needle bearings 264 affixed to the self-aligning bearing inner race 252. FIG. 2B shows a cutaway section C of the self-aligning bearing outer race 254 exposing several ball bearings 268 disposed between the self-aligning bearing inner race 252 and the self-aligning bearing outer race 254. The self-aligning bearing outer race 254 is affixed to an aircraft structure portion 211 to prevent the self-aligning bearing outer race 254 from rotating. The self-aligning bearing inner race 252 is integrated with the roll control crank 256 structure and rotates relative to the self-aligning bearing outer race 254 to transfer roll control forces generated by the roation of the roll control shaft 122.

It is noted that the aircraft structure portion 211 in FIG. 2B is shown outlined by a dotted line indicating a portion of a wall opening formed to permit mounting of the self-aligning bearing 128. The self-aligning bearing outer race 254 may be affixed to the wall structure comprising the aircraft structure portion 211. The self-aligning bearing outer race 254 may include a front surface 255 disposed substantially along the plane of the wall to enclose the ball bearings 268. The self-aligning bearing outer race 254 may be affixed to the aircraft structure by means other than the aircraft structure portion 211 shown in FIG. 2B. It is further noted that the aircraft structure portion 211 in FIG. 2B provides a fixture structure for the self-aligning bearing 128. Other parts of the example pitch control apparatuses described herein may require a fixture to the aircraft structure. Examples of such fixtures are illustrated in, for example, FIG. 2A at nos. 213, 215, and 217.

The self-aligning bearing inner race 252 includes a first shaft support section 252a and a second shaft support section 252b to provide an opening within the self-aligning bearing 128 for the roll control shaft 122. The roll control shaft 122 in FIG. 2B has a square cross-section and the first and second shaft support sections 252a,b form a square opening corresponding to the square cross-section of the roll control shaft 122. The square cross section of the roll control shaft 122 allows the surfaces of each side of the roll control shaft 122 to impart a rotational force on the first shaft support section 252a and the second shaft support section 252b when the roll control shaft 122 rotates. The needle bearings 264 are affixed to the self-aligning bearing inner race 252 between a surface of the shaft support sections 252a,b and the inner surface of the self-aligning bearing inner race 252. The needle bearings 264 are disposed to be in contact with the roll control shaft 122 to permit aftward and forward linear motion of the roll control shaft 122. The contact between the needle bearings 264 and the roll control shaft 122 causes the needle bearings 264 to roll as the roll control shaft 122 moves linearly back and forth through the self-aligning bearing inner race 252 in response to the pilot's pushing or pulling on the control wheel 106.

When the roll control shaft 122 rotates in response to the pilot's rotation of the control wheel 106 (in FIG. 1) as indicated at arc R1, the self-aligning bearing inner race 252 rotates as permitted by the ball bearings 268 against the stationary self-aligning bearing outer race 254. The rotation of the self-aligning bearing inner race 252 indicated by arc R2 imparts a rotational force on the roll control crank 256 via the first and second shaft support sections 252a,b. The rotation of the roll control crank 256 imparts a force on the roll pushrod 146, which is used by the roll control assembly 142 (in FIG. 1) to control the aircraft roll.

The self-aligning bearing 128 shown in FIG. 2B is one example implementation of a way of providing a support for the roll control shaft 122 as well as the horizontal control column 108. The self-aligning bearing 128 includes structure for providing a roll control interface to the roll control assembly 142 as described above. In other implementation, support for the roll control shaft 122 (or similar structure having no function relating to roll control) may be provided without the structure described for controlling roll or with other structure that provides roll control by different means.

Referring back to FIGS. 1 and 2A, the aircraft pitch control apparatus 102 includes a pitch output link 134 having a first pitch output link connection point 221 and a second pitch output link connection point 127 connected to the downstream pitch control mechanism 140. The pitch output link 134 transfers a force applied at the first pitch output link connection point 221 to the downstream pitch control mechanism 140. The pitch output link 134 may be implemented as a push/pull rod that drives any suitable downstream pitch control mechanism 140, some of which are known and in use in conventional aircraft. One such downstream pitch control mechanism is known as a "fly-by-wire" system. The fly-by-wire system is typically used in large modern aircraft. The pitch output link 134 attaches to a crank 141 on the downstream pitch control mechanism 140 that provides feel/centering forces, which may be generated by springs to provide the pilot a force against which to push/pull. The fly-by-wire implementation includes position sensors to transmit the pilot's control inputs to the computers that control the flight of the aircraft.

Another downstream pitch control mechanism 140 that may be used is a mechanically-commanded system. In a mechanically-commanded implementation typically found in older large airplanes, the downstream pitch control mechanism 140 would be located near the tail of the airplane and it would be designed to provide the same feel/centering forces. However, additional pushrods, or other mechanical component, would be used to mechanically connect to the input levers of servo actuators that position the elevator surfaces on the tail of the aircraft.

In a third, fully-manual implementation, typically found on aircraft weighing under 30,000 lb., the pitch output link would connect directly (via pulleys, cables, and additional pushrods) to the elevator surfaces, without any additional complexity in the pitch control system. The types of downstream pitch control mechanisms described above are provided as examples of the types of systems that can be designed to interface with the examples of pitch control apparatuses described herein. These descriptions are not intended as limitations as any suitable downstream pitch control mechanism may be used.

The aircraft pitch control apparatus 102 includes a transfer assembly 118 connected to the horizontal control column 108 and to the pitch output link 134 at the first pitch output link connection point 221. The transfer assembly 118 is configured to translate a horizontal force F applied to the horizontal control column 108 to the pitch output link 134. FIGS. 1 and 2A illustrate one example of a transfer assembly 118, which includes an idler link 120 pivotally connected at a first idler link connection point to a first aircraft structure point 213. The idler link 120 extends down from the first aircraft structure point 213 towards the horizontal control column 108.

The transfer assembly 118 also includes a pitch input crank 130 pivotally connected to a second aircraft structure point 215. The pitch input crank 130 extends from a pivot point at the second aircraft structure point 215 in one direction and extends from the second aircraft structure point 215 in another direction to connect to the first pitch output link connection point 221. The transfer assembly 118 also includes a coupler link 126 pivotally connected to the horizontal control column 108, to the pitch input crank 130, and to the idler link 120. The coupler link 126 includes an aft coupler link connection point (described with reference to FIG. 3), which connects to the horizontal control column 108. The coupler link 126 includes a fore coupler link connection point (described with reference to FIG. 3), which connects to the pitch input crank 130. The coupler link 126 also includes an inner coupler link connection point between the aft coupler connection point and the fore coupler link connection point to connect to a second idler link connection point 223 (in FIG. 2A).

The coupler link 126 may be implemented as a pair of link members disposed on opposite sides of the horizontal control column 108. The idler link 120 may also be implemented as a pair of idler link members extending from the first aircraft structure point 213 on opposite sides of the horizontal control column 108 to connect to corresponding link members forming the coupler link 126. The pitch input crank 130 may include a U-shaped portion to connect to each of the pair of link members forming the coupler link 126 on opposite sides of the horizontal control column 108. FIG. 2B shows such a U-shaped portion 136 extending to the pitch input crank 130 connections to each link member 126a,b forming the coupler link 126.

The transfer assembly 118 in the implementation described with reference to FIGS. 1 and 2A operate when the pilot applies a horizontal force F to the control wheel 106, which is transferred to the horizontal control column 108. The horizontal force from the horizontal control column 108 is applied to the coupler link 126. The coupler link 126 transfers the force to the pitch input crank 130. The pitch input crank 130 transfers the force to the pitch output link 134. In the example implementation shown in FIGS. 1 and 2A, the pitch input crank 130 rotates about a torque shaft 119 supported by the second aircraft structure point 215.

The first aircraft structure point 213, the second aircraft structure point 215, and the third aircraft structure point 217 are illustrated schematically as fixture points mounted on a generic triangular structure that is further illustrated schematically as being affixed to some structure of the aircraft. The fixture point is shown to suggest that components attached thereto may rotate about the fixture point. Specific implementations of the first aircraft structure point 213, the second aircraft structure point 215, and the third aircraft structure point 217 may use pins, hinges, bearings, or other suitable components. The fixture to the aircraft structure may be implemented using screws, adhesives, rivets, or other suitable fixing implements. With respect to the second aircraft structure point 215, the pitch input crank 130 may rotate about an axle, or rod, or similar devices affixed to the aircraft structure using known devices that would permit the pitch input crank 130 to pivot about the pivot point at the second aircraft structure point 215. In the example shown in FIGS. 1 and 2A, the torque shaft 119 may be supported by a hole in a panel or by a bracket. The support structure may include bearings to permit the torque shaft 119 to rotate.

As shown in FIG. 1, the torque shaft 119 extends from the pilot side of the pitch input crank 130 towards a central area of the aircraft control console 100. Similarly, the torque shaft of the pitch input crank of the co-pilot's aircraft pitch control apparatus 104 may also extend into the central area of the aircraft control console 100. The pilot's side pitch input crank 130 and the co-pilot's side pitch input crank connect to and control their corresponding pitch output links 134, which then drives the downstream pitch control mechanism 140 positioned substantially in the lower center section of the cockpit region. It is noted that the pitch input crank 130 with centrally extending torque shaft 119 shown in FIG. 1 is one example implementation of the shape and configuration of the pitch input crank 130. Other examples may be implemented as well in accordance with the environment, the space, the requirements of the downstream pitch control mechanism and other factors in place in any specific aircraft.

A stick shaker 148 is mounted at the pitch input crank 130 to provide a vibration of the pitch input crank 130 portion that connects to the coupler link 126 when the aircraft encounters dangerous conditions at low airspeeds. The vibration at the pitch input crank 130 is conducted through the horizontal control column 108 and sensed by the pilot as an alarm.

An autopilot controller may be mounted in, or connected to, an autopilot assembly 150 mounted on the portion of the pitch input crank 130 that extends to connect to the pitch output link 134. The autopilot assembly 150 includes an autopilot crank 151 attached to an autopilot reaction link 152. The autopilot reaction link 152 is attached at an end opposite the autopilot crank 151 to a third aircraft structure point 217. When the aircraft is in autopilot mode, an aircraft flight control system may send control signals to the autopilot controller, which then controls a motor to rotate the autopilot crank 151. The autopilot crank 151 imparts a rotational force on the pitch input crank 130 against the resistance provided by the autopilot reaction link 152. The rotational force on the pitch input crank 130 moves the pitch output link 134 to drive the downstream pitch control mechanism 140. In the example illustrated in FIG. 1, the autopilot assembly 150 is mounted to act as a counterweight to prevent the inertia of horizontal control column 108 from making unintended control inputs in response to airplane acceleration.

FIG. 3 is a side view of a pitch control apparatus 300 for control of aircraft pitch that may be used in the aircraft control console 100 in FIG. 1. FIG. 4 is a cross-sectional view of the apparatus depicted in FIG. 3. The pitch control apparatus 300 shown in FIGS. 3 and 4 comprises a control wheel 302, a horizontal control column 304, a self-aligning bearing 320, a roll control shaft 318, and parts of the transfer assembly. The self-aligning bearing 320 includes a support structure attached at an aircraft structure portion 311. In an example implementation, the self-aligning bearing outer race 254 (shown in FIG. 2B) is affixed to the first aircraft structure point as described above. The parts of the transfer assembly shown in FIGS. 3 and 4 include an idler link 312, a coupler link 310, and a pitch input crank 314. FIG. 3 illustrates the pivotal connection of the idler link 312 at a first idler link connection point 312a to a first aircraft structure point 313. The idler link 312 extends downward to connect to the coupler link 310.

The coupler link 310 includes an aft coupler link connection point 310a, a fore coupler link connection point 310b, and an inner coupler link connection point 310c. The idler link 312 connects at the second idler link connection point 312b to the inner coupler link connection point 310c. The aft coupler link connection point 310a connects the coupler link 310 to the horizontal control column 304. The pitch input crank 314 includes a first portion extending down from a torque shaft 317 supported by the second aircraft structure point 315 to connect to the fore coupler link connection point 310b. The pitch input crank 314 also includes a second portion 314b extending generally rearward from the second aircraft structure point 315 to connect to the first pitch output link connection point 221 (in FIG. 2A). The first portion 314a of the pitch input crank 314 is rigidly connected to the second portion 314b at the second aircraft structure point 315 at a fixed, predetermined angle. FIGS. 3 and 4 illustrate how a horizontal force F of the horizontal control column 304 applies the horizontal force F on the coupler link 310, which then transfers the force to the pitch input crank 314 thereby causing a rotation of the pitch input crank 314 about the torque shaft 317. The pitch input crank 314 rotation may then transfer a force on the pitch output link (not shown in FIGS. 3 and 4) to drive the downstream pitch control mechanism (not shown in FIGS. 3 and 4). The idler link 312 defines by its geometry the horizontal path of the motion of the horizontal control column 304.

The horizontal control column 304 includes a first section that extends at a downward angle at 304 near the connection to the control wheel 302 before changing to a second section at 306 extending horizontally in the forward direction. As shown in FIG. 4, the control wheel 302 may be linked to rotation input assembly that includes a shaft coupling assembly 400 configured to transfer the rotation of the control wheel 302 to a rotation of the roll control shaft 318. The shaft coupling assembly 400 may include a first beveled gear assembly 402 at a control wheel end of the shaft coupling assembly and a second beveled gear assembly 404 where the first section at 304 changes to the second section at 306 extending horizontally in the forward direction. In another example implementation, the first and second beveled gear assemblies 402, 404 may be replaced by universal joint (U-joint) assemblies. In other implementations, other suitable shaft coupling devices may be used.

Figure 5:
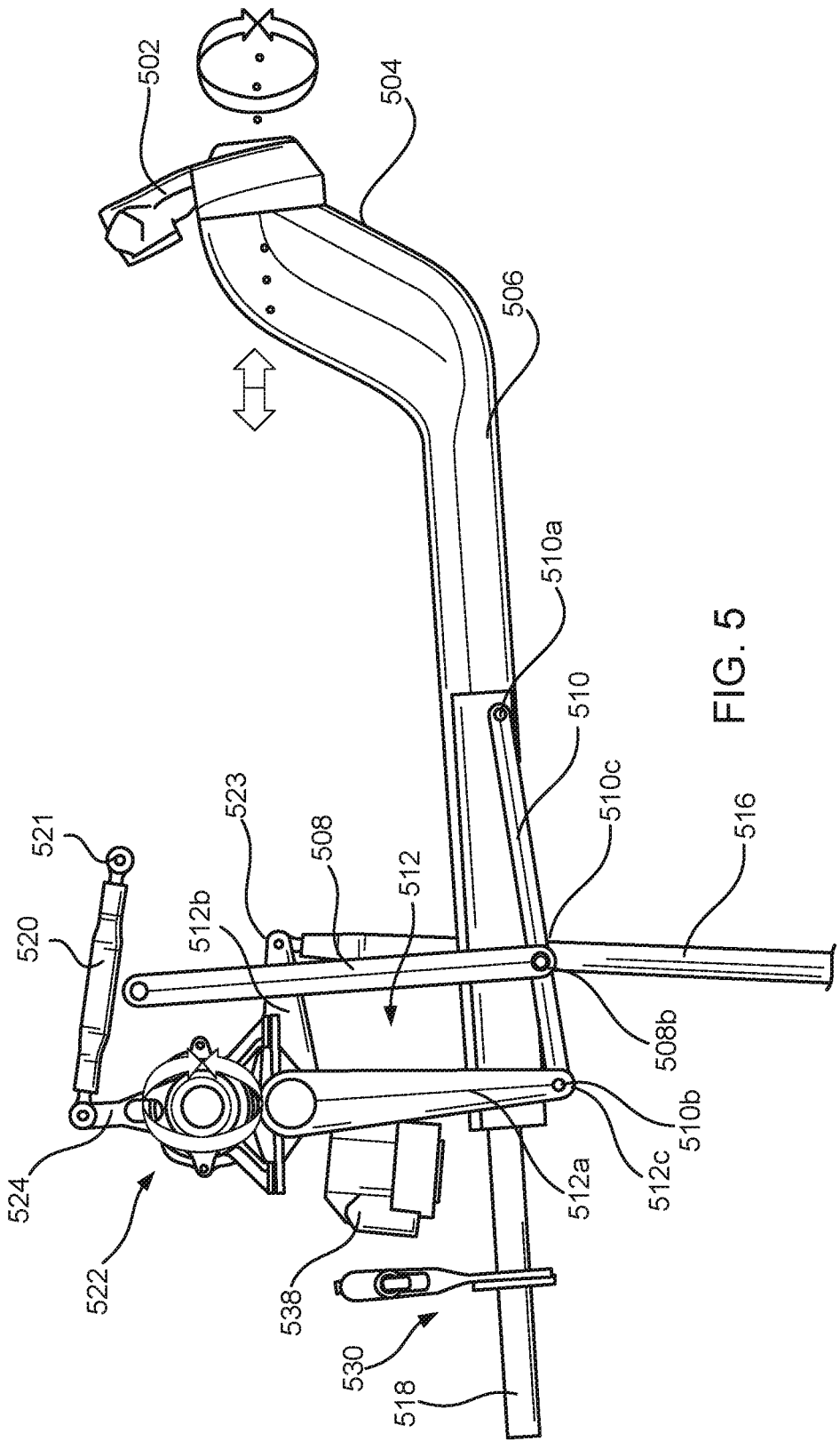
FIG. 5 is a side view of an example apparatus for control of aircraft pitch including an autopilot controller.

FIG. 5 is a side view of an example pitch control apparatus 500 that includes an autopilot assembly 522. The pitch control apparatus 500 in FIG. 5 includes a control wheel 502, a first section 504 of a horizontal control column, a second section 506 of the horizontal control column, a roll control shaft 518 extending from the horizontal control column, a coupler link 510, an idler link 508, a pitch input crank 512, a pitch output link 516, a reaction link 520, a stick shaker 538, and a self-aligning bearing 530. The autopilot assembly 522 includes a motor connected to rotate an autopilot crank 524, which is connected to a reaction link 520 that extends to a reaction link connection point 521 affixed to the aircraft structure.

The autopilot assembly 522 is mounted on, or connected to, the pitch input crank 512. An autopilot controller, which may be hardware and software components that form part of an aircraft flight control system, or an autopilot pitch control module within the autopilot assembly, controls the motor in the autopilot assembly 522 to rotate the autopilot crank 524. The rotation of the autopilot crank 524 causes the pitch input crank 512 to rotate against the resistance provided by the reaction link 520 affixed to the reaction link connection point 521. The pitch input crank 512 includes a first portion 512a extending generally downward to connect to the coupler link 510, and a second portion 512b that extends generally rearward to connect to the pitch output link 516 at a first pitch output link connection point 523. When the autopilot crank 524 rotates the pitch input crank 512, the second portion 512b of the pitch input crank 512 forces the pitch output link 516 to move thereby driving a pitch mechanism drive system to change the pitch of the aircraft.

As shown in FIG. 5, the pitch output link 516 may be controlled by the pilot using the control wheel 502 to move the horizontal control column in a horizontal direction (indicated in FIG. 5 at the pilot pitch input), or by the autopilot assembly 522. The autopilot assembly 522 may be controlled to activate the autopilot crank 524 to rotate. The rotation of the autopilot crank 524 is an autopilot pitch input that causes a rotation of the pitch input crank 512. The rotation of the pitch input crank 512 causes an angular motion of the second portion 512b of the pitch input crank 512. This angular motion of the second portion 512b of the pitch input crank 512 moves the pitch output link 516, which imparts a force on the downstream pitch control mechanism sufficient to cause a desired change in the aircraft pitch.

The stick shaker 538 applies a vibratory impulse to the first portion 512a of the pitch input crank 512, which imparts a vibrating sensation to the pilot's hands via the horizontal control column and control wheel 502. The transfer of the vibrating sensation to the control wheel 502 is consistent with typical stick shaker operation in which the stick shaker is attached directly to the neck of a conventional control column (for example, as in a 747 aircraft) or on a dedicated arm extending under the floor below the pivot of a conventional control column (for example, as in a 787 aircraft).

Figure 6:
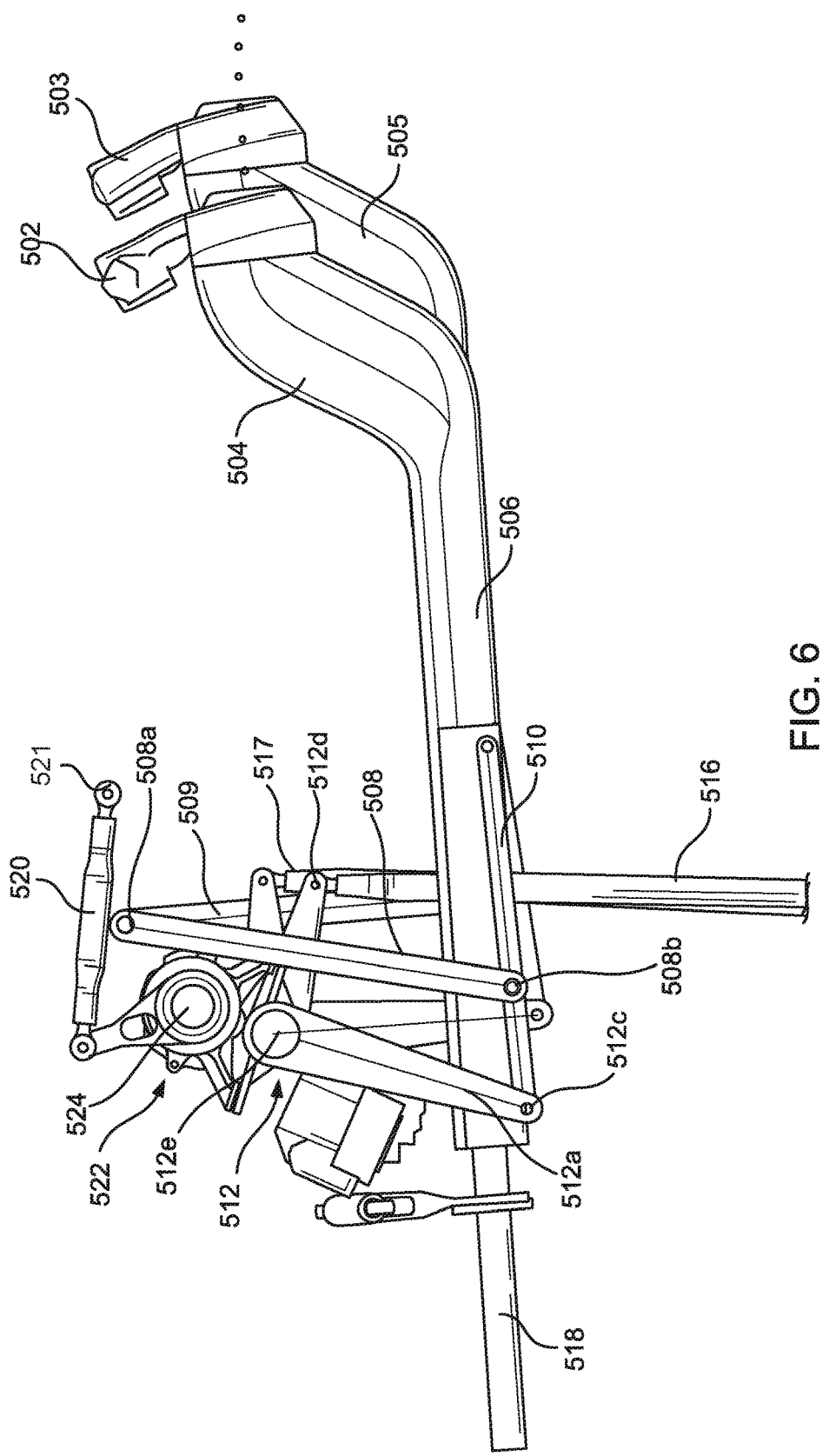
FIG. 6 is a side view of the apparatus in a fully forward position.
Figure 7:
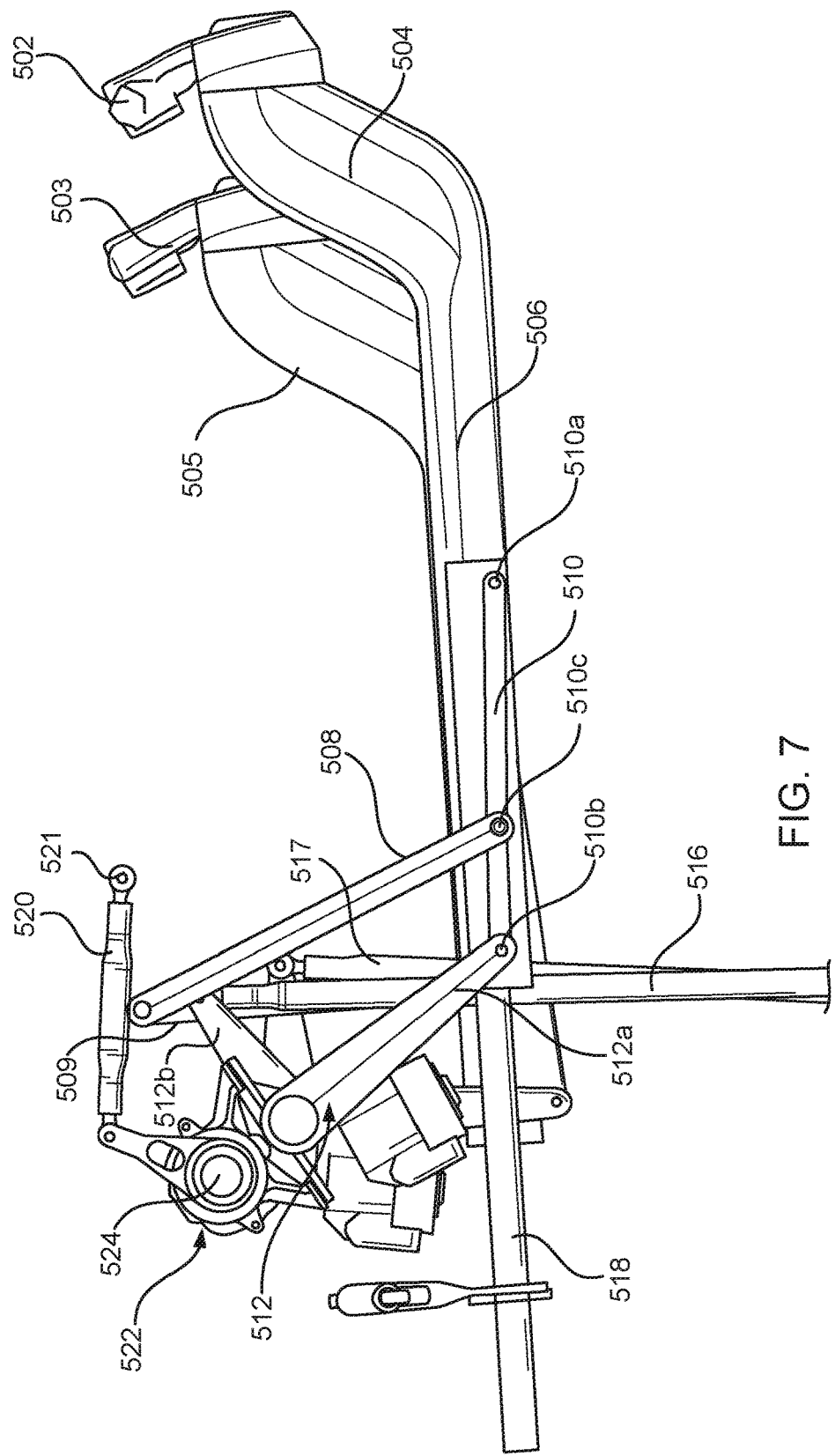
FIG. 7 is a side view of the apparatus in a fully aft position.

FIGS. 6 and 7 illustrate operation of the pitch control apparatus 500 in FIG. 5 by illustrating the pitch control apparatus 500 at its most forward and most rearward positions. FIG. 6 is a side view of the pitch control apparatus 500 in a fully forward position. FIG. 7 is a side view of the pitch control apparatus 500 in a fully aft position. In FIGS. 6 and 7, a side view of the co-pilot's pitch control apparatus components is illustrated as having maintained its position to illustrate the motion of the components of the pilot's pitch control apparatus 500. It is noted that the co-pilot's pitch control apparatus components are shown in FIGS. 6 and 7 for purposes of illustrating operation of the pitch control apparatus as in example implementations, the pilot and co-pilot pitch control apparatuses would be mechanically synchronized.

FIG. 6 shows the position of the pilot's control wheel 502 pushed forward of the co-pilot's control wheel 503. The pushing of the pilot's control wheel 502 applies a force on the first section 504 of the horizontal control column, which transfers the force on to the coupler link 510. The coupler link 510 transfers the horizontal force to the pitch input crank 512. The first portion 512a of the pitch input crank 512 rotates clockwise about the torque shaft of the pitch input crank 512 causing a generally downward and angular movement of the second portion 512b of the pitch input crank 512. The second portion 512b of the pitch input crank 512 imparts a force on the pitch output link 516. The translation of the pitch output link 516 is shown by its position relative to the co-pilot's pitch output link 517. The position of the pitch output link 516 shown in FIG. 6 may have also been reached by a clockwise rotation of the autopilot assembly 522. The autopilot assembly 522 rotates, causing a rotation of the pitch input crank 512 that mimics the rotation of the pitch input crank 512 caused by moving the horizontal control column to the fully forward position.

FIG. 7 shows the position of the pilot's control wheel 502 pulled rearward fully aft of the co-pilot's control wheel 503. The pulling of the pilot's control wheel 502 applies a rearward force on the horizontal control column, which transfers the force on to the coupler link 510. The coupler link 510 transfers the rearward horizontal force to the pitch input crank 512. The first portion 512a of the pitch input crank 512 rotates counter-clockwise about the torque shaft of the pitch input crank 512 causing a generally upward and angular movement of the second portion 512b of the pitch input crank 512. The second portion 512b of the pitch input crank 512 imparts a force on the pitch output link 516. The translation of the pitch output link 516 is shown by its position relative to the co-pilot's pitch output link 517. The position of the pitch output link 516 shown in FIG. 8 may have also been reached by a counter-clockwise rotation of the autopilot assembly 522. The autopilot assembly 522 rotates, causing a rotation of the pitch input crank 512 that mimics the rotation of the pitch input crank 512 caused by moving the horizontal control column to the fully aft position.

Referring to FIGS. 6 and 7, the relative positions of the components of the pitch control apparatus 500 in the fully fore and the fully aft positions illustrate the generally horizontal path of the pitch control apparatus 500. In an example implementation, the generally horizontal path of the pitch control apparatus 500 may be configured to follow a path that is familiar to pilots, particularly when pulling the pitch control apparatus 500 in the aft direction. The generally horizontal path may be configured to arc downward slightly as the pilot reaches the fully aft position of the pitch control apparatus 500. A substantially straight-line path (within a certain range of motion) may be achieved by dimensioning the coupler link 510, the pitch input crank 512, and the idler link 508 so that:

$$\frac{A}{B} = \frac{C}{D};$$

where:

A=Distance between aft coupler link connection point 510*a* and fore coupler link connection point 510*b*;

B=Distance between aft coupler link connection point 510*a* and inner coupler link connection point 510*c*;

C=Distance between first idler link connection point 508*a* (in FIG. 6) and second idler link connection point 508*b* (in FIG. 6);

D=Distance between first pitch input crank connection point 512*c* (in FIG. 6) and a pivot point 512*e* of the pitch input crank 512 (in FIG. 6).

When the dimensions of the coupler link 510, the pitch input crank 512, and the idler link 508 are as described above results in a straight line path in a given range of motion and a downward arc at the fully aft position when the horizontal control column has moved beyond the given range of motion. Such a pattern of travel is illustrated in FIG. 8.

FIG. 8 is a schematic diagram of an aft section 800 of the horizontal control column 802 and control wheel 804 illustrutating an example of the fore and aft travel of the horizontal control column 802 during operation. The aft section 800 in FIG. 8 extends over a cockpit floor 808 in the cockpit of an aircraft in a direction substantially parallel to an aircraft cockpit floor 808 from the fore end of the cockpit. The aft section 800 is moved by the pilot in a fore and aft movement indicated by double block arrow M along a plane substantially parallel to the cockpit floor 808. The horizontal control column 802 extends from the control wheel 804 under an aircraft instrument panel, such as the front instrument panel 116 in FIGS. 1 and 2A. The horizontal control column 802 extends toward a cockpit fore wall in a direction substantially parallel to the aircraft cockpit floor 808.

It is noted that the horizontal control column 802 is described as extending in a direction substantially parallel to the cockpit floor 808, and that the fore and aft movement M of the horizontal control column 802 is along a plane substantially parallel to the cockpit floor 808. The term "substantially parallel" shall mean any direction that does not intersect the area of the cockpit floor 808. The term "plane" shall mean a space above the cockpit floor 808 that need not mean perfectly planar. As noted below, an optimal extent of travel for the horizontal control column 802 may be partially linear (substantially following a plane) for a portion of the travel and curved downward (and off the plane) for another portion of the travel.

Known pitch control columns are vertically mounted (or, perpendicular to the cockpit floor) and extend through the cockpit floor 808 to other pitch control mechanisms underneath the cockpit floor 808. By extending underneath the instrument panel in a direction substantially parallel to the cockpit floor 808, the horizontal control column 802 leaves space on the cockpit floor 808 under the horizontal control column 802 to provide legroom for the pilot and to free up space underneath the cockpit floor 808 for equipment other than flight control equipment. The horizontal configuration of the control column 802 also eases manufacture by eliminating the need to install or adjust moving parts under the cockpit floor 808.

The horizontal control column 802 is supported by the aircraft structure to at least one aircraft structure point by a linkage system. In example implementations described above with reference to FIGS. 1-4, the linkage system includes the coupler link 310, the idler link 312, and the transfer assembly 314 (in FIG. 3). The linkage system supports the horizontal control column 802 and enables fore and aft movement of the horizontal control column 802 substantially along a plane substantially parallel to the aircraft cockpit floor 808. The horizontal control column 802 also includes a connection to the pitch output link as described above with reference to FIGS. 1-7. The pitch output link transfers a first force received via fore and aft movement M of the horizontal control column 802 to a second force applied to the downstream pitch control mechanism, which is configured to alter a pitch angle of the aircraft in response to the second force as described above with reference to FIGS. 1 and 2A.

FIG. 8 includes a reference line 803 indicative of a completely linear fore and aft movement of the horizontal control column 802 and a second curved line 805 indicative of optimal fore and aft movement of the horizontal control column 802. The reference line 803 in FIG. 8 is horizontal, or parallel to the cockpit floor 808, but may be at an angle less than perpendicular with respect to the cockpit floor 808 that follows the fore and aft movement M of the horizontal control column 108. In example implementations of the linkage system supporting the horizontal control column 802, the linkage system enables a linear fore and aft movement over a forward portion (indicated by line L in FIG. 8) of a total extent of control column travel (indicated by line T in FIG. 8) and an arcuate movement over an aft portion (indicated by line A in FIG. 8) of the total extent of control column travel T.

In an example implementation, the A/B=C/D relationship described above for determining dimensions of the parts of the example linkage system illustrated in FIGS. 6 and 7 may provide an optimal extent of travel for the horizontal control column 802. Such an optimal extent of travel for the horizontal control column 802 may follow the second curved line 805 in FIG. 8, which follows the reference line 803 in the forward portion L and the curved line 805 in the aft portion A. Suitable dimensions may be determined so that the linear fore and aft movement in the forward portion L extends over about 75% of the total extent of control column travel T and the arcuate movement in the aft portion A extends over about 25% of the total extent of control column travel T.

It is noted that components such as the coupler link, the idler link, the pitch output link, and the pitch input crank are depicted in the drawings as having a particular shape and configuration. For example, the idler link and the coupler link is depicted as a strip of material, preferably a rigid material such as metal (See e.g. FIGS. 5-7). It is to be understood that the particular shapes and the configurations of any of the components depicted in the drawings are provided as examples and in a manner that provides clarity to the description. No shape or configuration is indicated by way of limitation.

It will be understood that various aspects or details of the disclosure may be changed without departing from the scope of the disclosure. The above description is not exhaustive and does not limit the claimed disclosures to the precise form disclosed. Furthermore, the above description is for the purpose of illustration only, and not for the purpose of limitation. Modifications and variations are possible in light of the above description or may be acquired from practicing the disclosure. The claims and their equivalents define the scope of the disclosure.

What is claimed is:

1. An apparatus comprising:
    a control column coupled to a control wheel, a portion of the control column configured to be substantially parallel with a cockpit floor while a plane of rotation of the control wheel is perpendicular with the cockpit floor;
    a pitch output link having a first pitch output link connection point, the pitch output link connected to a downstream pitch control mechanism, wherein the pitch output link is configured to transfer a first force applied at the first pitch output link connection point to the downstream pitch control mechanism;
    a transfer assembly connected to the control column and to the pitch output link at the first pitch output link connection point, wherein the transfer assembly is configured to translate a second force applied to the control column to the pitch output link, the second force substantially parallel with the portion of the control column;
    a roll control shaft connected to the control wheel and extending through the control column; and
    a self-aligning bearing connected to an aircraft structure portion and positioned to support the roll control shaft.

2. The apparatus of claim 1, wherein the control column is not directly coupled to the cockpit floor.

3. The apparatus of claim 1, wherein the transfer assembly includes:
    an idler link pivotally connected to a first aircraft structure point, wherein the idler link is coupled to the control column;
    a pitch input crank pivotally connected to a second aircraft structure point and is coupled to the first pitch output link connection point; and
    a coupler link pivotally connected to the control column, to the pitch input crank, and to the idler link, wherein the second force is applied to the coupler link, wherein the coupler link transfers the second force to the pitch input crank, and wherein the pitch input crank transfers the second force to the pitch output link.

4. The apparatus of claim 1, wherein the portion of the control column is configured to be substantially perpendicular with a front instrument panel while the plane of rotation of the control wheel is parallel with the front instrument panel.

5. The apparatus of claim 3, wherein the coupler link includes:
    an aft coupler link connection point on a first end of the coupler link pivotally coupled to the control column;
    a fore coupler link connection point on a second end of the coupler link pivotally coupled to the pitch input crank; and
    an inner coupler link connection point between the first end and the second end, the inner coupler link connection point pivotally coupled to the idler link.

6. The apparatus of claim 3, wherein the transfer assembly is configured to enable the portion of the control column to be moved non-parallel with the cockpit floor.

7. The apparatus of claim 3, wherein the pitch input crank further includes:
    a first portion coupled to the coupler link; and
    a second portion coupled to the first pitch output link connection point, wherein the first portion is coupled to the second portion via a third portion at the second aircraft structure point, and wherein the first portion is nonparallel to the second portion.

8. The apparatus of claim 1, wherein a second portion of the control column is configured to be non-parallel with the portion of the control column, wherein the control wheel is directly coupled to the second portion of the control column.

9. The apparatus of claim 3, wherein the coupler link includes:
    an aft coupler link connection point on a first end of the coupler link pivotally coupled to the control column;
    a fore coupler link connection point on a second end of the coupler link pivotally coupled to the pitch input crank; and
    an inner coupler link connection point between the first end and the second end, the inner coupler link connection point pivotally coupled to the idler link; and
    wherein the idler link includes:
        a first idler link connection point pivotally coupled to the first aircraft structure point: and
        a second idler link connection point pivotally coupled to the coupler link at the inner coupler link connection point, wherein the pitch input crank is coupled to the second aircraft structure point, a first pitch input crank connection point, a second pitch input crank connection point, and the first pitch output link connection point, and wherein the coupler link, idler link, and pitch input crank have dimensions such that a first ratio calculated as a distance between the aft coupler link connection point and the fore coupler link connection point divided by a distance between the aft coupler link connection point and inner coupler link connection point is substantially equal to a second ratio calculated as a distance between the first idler link connection point and the second idler link connection point divided by a distance between the first pitch input crank connection point and the second aircraft structure point.

10. The apparatus of claim 1, wherein the self-aligning bearing includes:
    a self-aligning bearing inner race coupled to the roll control shaft, wherein the self-aligning bearing inner race provides support to a plurality of needle bearings in contact with the roll control shaft, wherein the plurality of needle bearings are configured to enable aftward and forward linear motion of the roll control shaft; and
    a self-aligning bearing outer race coupled to a plurality of ball bearings in contact with the self-aligning bearing inner race, wherein the plurality of ball bearings enable rotation of the self-aligning bearing inner race relative to the self-aligning bearing outer race, wherein the self-aligning bearing outer race is fixedly coupled to the aircraft structure portion, wherein the self-aligning bearing inner race is coupled to a roll control crank, and wherein the self-aligning bearing inner race is configured to transfer roll control forces generated by the rotation of the roll control shaft to the roll control crank.

11. An aircraft control console comprising:
a front instrument panel; and
a pitch control apparatus including:
   a control column coupled to a control wheel, a portion of the control column configured to be substantially perpendicular with the front instrument panel while a plane of rotation of the control wheel is parallel with the front instrument panel;
   a pitch output link having a first pitch output link connection point, the pitch output link connected to a downstream pitch control mechanism, the pitch output link configured to transfer a first force applied at the first pitch output link connection point to the downstream pitch control mechanism; and
   a transfer assembly connected to the control column and to the pitch output link at the first pitch output link connection point, the transfer assembly configured to translate a second force applied to the control column to the pitch output link, the second force substantially parallel with the portion of the control column;
   a roll control shaft connected to the control wheel and extending through the control column; and
   a self-aligning bearing connected to an aircraft structure portion and positioned to support the roll control shaft.

12. The aircraft control console of claim 11, wherein the transfer assembly of the pitch control apparatus includes:
   an idler link pivotally connected to a first aircraft structure point, wherein the idler link is coupled to the control column;
   a pitch input crank pivotally connected to a second aircraft structure point and coupled to the first pitch output link connection point; and
   a coupler link pivotally connected to the control column, to the pitch input crank, and to the idler link, wherein the second force is applied to the coupler link, wherein the coupler link transfers the second force to the pitch input crank, and wherein the pitch input crank transfers the second force to the pitch output link.

13. The aircraft control console of claim 12, wherein a second portion of the control column is configured to be non-parallel with the portion of the control column, wherein the control wheel is directly coupled to the second portion of the control column.

14. The aircraft control console of claim 12, wherein the coupler link includes:

an aft coupler link connection point pivotally coupled to the control column;
a fore coupler link connection point pivotally coupled to the pitch input crank; and
an inner coupler link connection point between the aft coupler link connection point and the fore coupler link connection point pivotally coupled to the idler link.

15. The aircraft control console of claim 12, wherein the portion of the control column is configured to be substantially parallel with a cockpit floor while the plane of rotation of the control wheel is perpendicular with the cockpit floor.

16. The aircraft control console of claim 12, wherein the pitch input crank further includes:
   a first portion coupled to the coupler link; and
   a second portion coupled to the first pitch output link connection point, wherein the first portion is coupled to the second portion via a third portion at the second aircraft structure point, and wherein the first portion is nonparallel to the second portion.

17. The aircraft control console of claim 15, wherein the control column is not directly coupled to the cockpit floor.

18. An apparatus comprising:
   a control column coupled to a control wheel, a portion of the control column configured to be substantially parallel with a cockpit floor while a plane of rotation of the control wheel is perpendicular with the cockpit floor;
   a linkage system attached an aircraft structure point and to the control column, the linkage system configured to support the control column and to enable fore and aft movement of the control column substantially along a plane substantially parallel to the cockpit floor;
   a pitch output link configured to convert a first force received via fore and aft movement of the control column to a second force applied to a downstream pitch control mechanism configured to alter a pitch angle of an aircraft in response to the second force;
   a roll control shaft connected to the control wheel and extending through the control column; and
   a self-aligning bearing connected to a second aircraft structure portion and positioned to support the roll control shaft.

19. The apparatus of claim 18 where the linkage system is configured to enable a linear fore and aft movement over a forward portion of a total extent of control column travel and an arcuate movement over an aft portion of the total extent of control column travel.

20. The apparatus of claim 19 where the linear fore and aft movement in the forward portion extends over about 75% of the total extent of control column travel and the arcuate movement in the aft portion extends over about 25% of the total extent of control column travel.

* * * * *